Patented Jan. 19, 1954

2,666,768

UNITED STATES PATENT OFFICE 2,666,768

PURIFICATION OF 2,2'-DIMETHYL-1,1'-DIANTHRAQUINONYL

Lynne H. Ulich, Woodstown, N. J., and William R. Waldron, Wilmington, Del., assignors to E. I. du Pont de Nemours & Company, Wilmington, Del., a corporation of Delaware No Drawing. Application June 18, 1952, Serial No. 294,276

3 Claims. (Cl. 260—367)

This invention relates to the purification of 2,2'-dimethyl-1,1'-dianthraquinonyl which is contaminated with cuprous chloride and organic impurities.

2,2'-dimethyl-1,1'-dianthraquinonyl may be prepared by heating 1-halogeno-2-methyl anthraquinone with copper powder. This requires a relatively high temperature and results in the formation of a copper halide and some tarry matter. 2,2'-dimethyl-1,1'-dianthraquinonyl may also be prepared by diazotizing 1-amino-2-methyl anthraquinone in a sulfuric acid solution by the addition of sodium nitrite. The diazo compound may then be isolated in the normal way and heated with copper powder in a suitable solvent. Again the dianthraquinonyl is contaminated with organic impurities and copper salts. In still another process, the 1-diazo-2-methyl anthraquinone is suspended in water and treated with cuprous chloride or cuprous bromide to couple the anthraquinones and form 2,2'-dimethyl-1,1'-dianthraquinonyl. In this case, also, the compound is contaminated with organic impurities and copper salts. Cuprous chloride, along with some cupric chloride, is the most common copper salt in the impure dianthraquinonyl.

Many methods have been proposed to remove the organic by-products resulting from the process and the copper salts, but none is entirely satisfactory. One such method involves two steps, one for the separation of the cuprous chloride and a second distinct step for purifying the dianthraquinonyl compound from the organic by-products of the reaction. Such a process is time-consuming and results in an over-all loss in yield due to the double handling.

It is therefore an object of the present invention to provide a simple, economical process for purifying 2,2'-dimethyl-1,1'-dianthraquinonyl. Another object is the purification of this compound in which the copper and organic contaminants are removed in a single step. Other objects will be apparent as the description of the invention proceeds.

These and other objects are accomplished by dissolving each part of the crude 2,2'-dimethyl-1,1'-dianthraquinonyl containing cuprous chloride and organic impurities in a solution of 4 to 6 parts of concentrated sulfuric acid and 1 part of nitrobenzene, diluting the solution with water to a sulfuric acid strength of 81% to 83% while maintaining the mixture at a temperature of about 105° to 110° C., filtering off the precipitate consisting of 2,2'-dimethyl-1,1'-dianthraquinonyl and cupric sulfate, dissolving the cupric sulfate from the filter with water, and recovering the pure 2,2'-dimethyl-1,1'-dianthraquinonyl. The conditions of carrying out the invention are rather critical, but when they are observed, a yield of 98%–99% is obtained, based on the purity of the starting crude product.

The maximum yields are obtained when 5 parts of concentrated sulfuric acid are used in each part of nitrobenzene. When larger amounts of sulfuric acid are used, the yield drops off, due to more of the dianthraquinonyl compound being in solution. Smaller amounts of sulfuric acid tend to cause some of the organic impurities to separate by diminishing the solubilizing effect of the nitrobenzene component. The preferred range is from 4 to 6 parts of concentrated (95% to 99%) sulfuric acid for each part of nitrobenzene. Water is added to reduce the strength of the acid from 81% to 83%, the preferred value being 82%. If more water is added, some separation of nitrobenzene into a separate phase with a corresponding decrease in the quality of the product is obtained, and if less water is added a lower yield results since some of the dianthraquinonyl compound remains in solution although the quality of the recovered product is satisfactory.

It has also been found that maintaining a temperature of 105° to 110° C. improves the crystalline form of the purified 2,2'-dimethyl-1,1'-dianthraquinonyl which facilitates filtration and washing out the impurities. At this temperature cuprous chloride is converted to cupric sulfate more readily.

The following example illustrates the preferred embodiment of the invention, and is given by way of illustration.

EXAMPLE

Into a vessel equipped with an agitator and jacketed for heating and cooling, 750 parts of 99% sulfuric acid and 150 parts of dry nitrobenzene are introduced. 150 parts of crude 2,2'-dimethyl-1,1'-dianthraquinonyl, containing cuprous chloride and organic impurities present from its preparation are then added. The mass is agitated for about 1 hour at 25° to 35° C. to ensure complete solution, after which 150 parts of water are added slowly while agitating. Normally the temperature will rise to about 105° to 110° C. as the water is added. The addition of water reduces the acid strength to 82%. During the addition of water, the 2,2'-dimethyl-1,1'-dianthraquinonyl separates as large yellow plates and the cuprous chloride is converted to cupric sulfate which precipitates. Hydrogen chloride and sulfur dioxide are evolved during this time, presumably as by-products of the oxidation of the cuprous chloride and its conversion to cupric sulfate. The agitation of the mass is continued for 30 minutes after the water has been added, keeping the temperature at 105° to 110° C. by heating if necessary.

The mass is then cooled to 25° to 30° C. while agitating over a period of 4 to 6 hours, after which it is filtered on a porous block filter, such as carborundum, and the filter cake is washed with 750 parts of 82% sulfuric acid. The final wash liquor should be only slightly colored by organic impurities.

The filter cake is transferred to a steam distillation vessel and the residual nitrobenzene is distilled out. During the steam distillation, the cupric sulfate dissolves in the water phase. When all the nitrobenzene has been removed, the mass is cooled somewhat and the 2,2'-dimethyl-1,1'-dianthraquinone is filtered off. The filtrate is reserved for recovery of copper sulfate. The filter cake is washed with water until the filtrate is acid-free, and dried at 100° to 105° C. A yield of 84.2 parts of 2,2'-dimethyl-1,1'-dianthraquinonyl in the form of yellow plates is obtained, representing a 98% yield based on the purity of the original crude product.

The main advantage of the present invention is the simplicity and effectiveness of the process in removing the impurities in a one-step process.

It is apparent that many widely different embodiments of this invention may be made without departing from the spirit and scope thereof, and therefore it is not intended to be limited except as indicated in the appended claims.

We claim:

1. The process of purifying 2,2'-dimethyl-1,1'-dianthraquinonyl contaminated with other organic compounds and cuprous chloride, which comprises dissolving one part of the crude 2,2'-dimethyl-1,1'-dianthraquinonyl in a solution containing an amount of sulfuric acid equal to about 4 to 6 parts of 95% to 99% sulfuric acid and 1 part of nitrobenzene, diluting the solution with water until the sulfuric acid strength is between about 81% and 83%, adjusting the temperature to about 105° to 110° C., filtering off the precipitate so formed, washing, and recovering the pure 2,2'-dimethyl-1,1'-dianthraquinonyl.

2. In the process of purifying crude 2,2'-dimethyl-1,1'-dianthraquinonyl contaminated with other organic compounds and cuprous chloride, the improvement which comprises dissolving 1 part of the said crude dianthraquinonyl compound in a solution containing an amount of sulfuric acid equal to about 4 to 6 parts of 95% to 99% sulfuric acid and 1 part of nitrobenzene, diluting the solution with water until a sulfuric acid strength of 81% to 83% is obtained, maintaining the temperature at about 105° to 110° C., filtering off the precipitate so formed, washing, and recovering the pure 2,2'-dimethyl-1,1'-dianthraquinonyl.

3. The process of purifying 2,2'-dimethyl-1,1'-dianthraquinonyl contaminated with other organic compounds and cuprous chloride which comprises mixing about 150 parts of the crude 2,2'-dimethyl-1,1'-dianthraquinonyl with 750 parts of 99% sulfuric acid and 150 parts of nitrobenzene, agitating the mass for about 1 hour at 25° to 35° C. until solution is complete, adding about 150 parts of water to the solution, adjusting the temperature to about 110° C., recovering the precipitate of 2,2'-dimethyl-1,1'-dianthraquinonyl which separates, washing the recovered precipitate with 750 parts of 82% sulfuric acid, and removing any nitrobenzene retained in the precipitate by steam distillation.

LYNNE H. ULICH.
WILLIAM R. WALDRON.

References Cited in the file of this patent

UNITED STATES PATENTS

| Number | Name | Date |
|---|---|---|
| 828,778 | Scholl | Aug. 14, 1906 |
| 1,834,876 | Smith et al. | Dec. 1, 1931 |
| 1,914,450 | Nawiasky et al. | June 20, 1933 |